United States Patent [19]

Long

[11] 4,264,093
[45] Apr. 28, 1981

[54] BUMPER EXTENSION FOR HEAVY VEHICLES

[76] Inventor: Alvin L. Long, Civilian Gen. Del., Beale A.F.B., Calif. 95903

[21] Appl. No.: 27,317

[22] Filed: Apr. 5, 1979

[51] Int. Cl.³ ............................................. B60R 19/02
[52] U.S. Cl. ...................................... 293/103; 293/112; 293/115
[58] Field of Search ............... 293/103, 111, 112, 115, 293/118, 140, 1, DIG. 1; 280/770

[56] References Cited

U.S. PATENT DOCUMENTS

| | | | |
|---|---|---|---|
| 1,415,518 | 5/1922 | Buck | 293/118 |
| 1,702,027 | 2/1929 | Beaver | 293/115 |
| 2,396,652 | 3/1946 | Heilman | 293/115 |
| 3,287,024 | 11/1966 | Ulinski | 280/43.12 |

*Primary Examiner*—Robert R. Song

[57] ABSTRACT

A front bumper for vehicles which can replace conventional bumpers to a great advantage mechanically.

1 Claim, 3 Drawing Figures

BUMPER EXTENSION FOR HEAVY VEHICLES

The present invention is a double walled perforated bumper and a vertical grill like extension, said extension is adjustable up or down through the perforations of the double walled bumper by use of hydraulics, and can be adjusted to 3 basic positions which are as follows:

A. The top position, the grill like bumper extension is entirely above the double walled perforated bumper and serves as a grill work to protect the vehicle radiator and other vital parts of the vehicle front, for off the road travel.

B. The middle position, the grill like bumper extension is half above the double walled perforated bumper and half below, in this position it serves as a push bumper for vehicles, and can be easily adjusted to any bumper height.

C. The bottom position, the adjustable grill like bumper is extended below the double walled perforated bumper and is within a few inches of the road surface, in this position large objects are prevented from passing under a vehicle, also in the bottom position the grill like bumper extension can be used as a bumper jack, by placing blocks or a similar object under the grill when the grill is in a higher position, and then lowering the grill work on the blocks a lifting action takes place with the front end of the vehicle, in this position front tires can be replaced.

SUMMARY

The present invention was designed primarily to prevent large trucks from running over small cars, which seems to be an ever-increasing problem. Large trucks can literally run over small cars with fatal results to the occupants of said small car.

It has been apparent in making a working model of the present invention that the grill work could be made movable to serve other uses, and this is how it was designed, it is believed that an adjustable bumper will serve many useful purposes not only on the highway but also off.

DETAILED DESCRIPTION OF THE DRAWINGS

Figure 1:
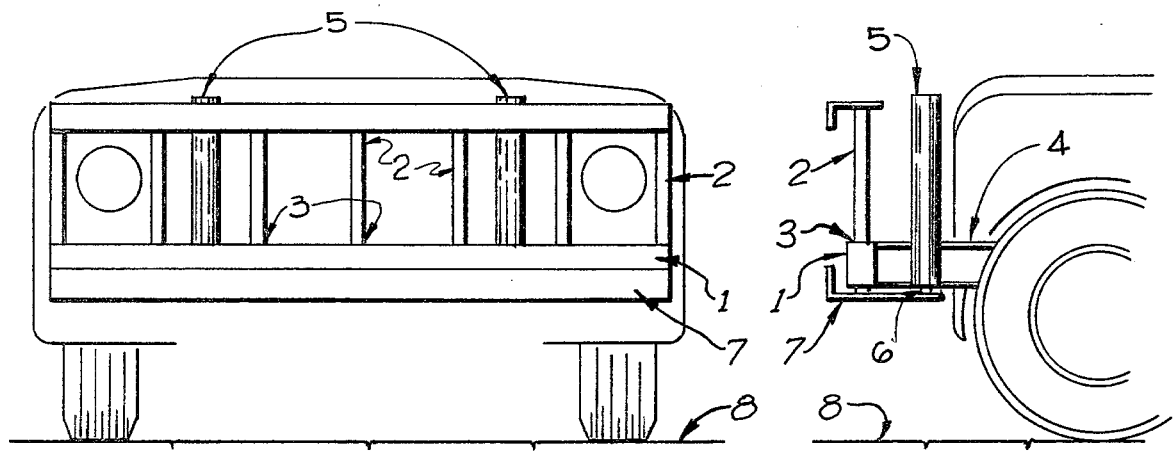
FIG. 1 represents perforated bumper with the adjustable grill work in an upper position, front view and side view.

In the drawings FIG. 1 is a front and side view of an adjustable vehicle bumper 1, a double walled perforated bumper 1 has a grill work 2 that is adjustable up or down through the perforations in the bumper 1, the bumper 1 is firmly attached to the vehicle frame ends 4, a hydraulic ram 5 is used to adjust the grill work 2, said hydraulic ram cylinder 5 is attached to the bumper 1, the hydraulic rod 6 is completely inside of the cylinder 5, and in this position the grill work 2 which is attached to the rod end 7 is completely above the perforated bumper 1, and in this position it is at a maximum distance from the roadway 8.

Figure 2:
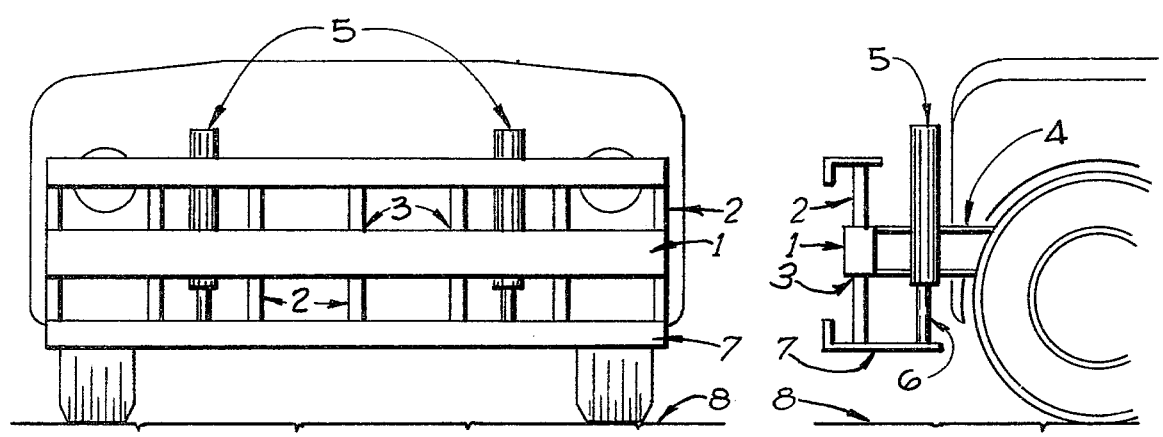
FIG. 2 represents a perforated bumper with the adjustable grill work in a central position, front view and side view.

FIG. 2 is a front and side view of an adjustable vehicle bumper 1, a double walled perforated bumper 1 has a grill work 2 that is adjustable up or down through the perforations 3 in the bumper 1, the bumper 1 is firmly attached to the vehicle frame ends 4, a hydraulic ram 5 is used to adjust the grill work 2, said hydraulic ram cylinder 5 is attached to the bumper 1, the hydraulic rod 6 is half way extended out of the cylinder 5, and in this position the grill work 2 which is attached to the rod ends 7 is in a central position half above the perforated bumper 1 and half below, in this position the grill work 2 is in a central position above the roadway 8.

Figure 3:
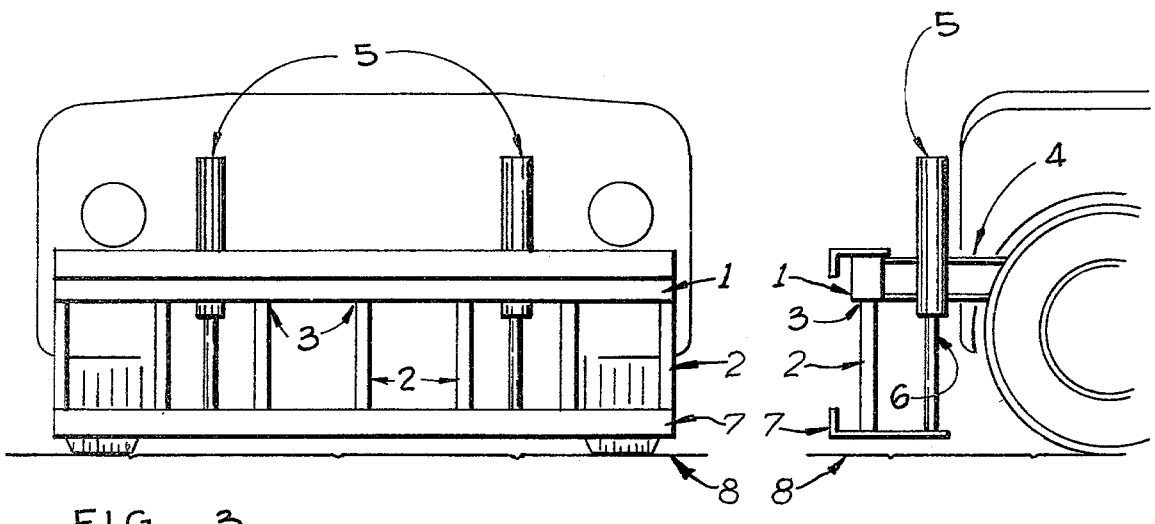
FIG. 3 represents a perforated bumper with the adjustable grill work in the lower position, front view and side view.

FIG. 3 is a front and side view of an adjustable vehicle bumper 1, a double walled perforated bumper 1 has a grill work 2 that is adjustable up or down through the perforations 3 in the bumper 1, the bumper 1 is firmly attached to the vehicle frame ends 4, a hydraulic ram 5 is used to adjust the grill work 2, said hydraulic ram cylinder 5 is attached to the bumper 1, the hydraulic rod 6 is extended to its full length, and in this position the grill work 2 which is attached to the rod ends 7 is within a few inches of the roadway 8.

Having described my invention in full, what is claimed as new is:

1. An adjustable bumper comprising a laterally extending stationary front bumper rigidly secured to a vehicle frame, said stationary bumper having a plurality of laterally spaced vertically extending bores, a vertically adjustable grillwork having a plurality of laterally spaced vertical frame members, one of said vertical frame members being slidably received in a respective one of said vertically extending bores, at least one hydraulic ram operatively connected to said adjustable grillwork and said vehicle frame, whereby said adjustable grillwork may assume a plurality of vertically adjusted positions.

* * * * *